US011868124B2

(12) United States Patent
Dippel et al.

(10) Patent No.: US 11,868,124 B2
(45) Date of Patent: Jan. 9, 2024

(54) APPARATUS, SYSTEM AND METHOD OF FORMING POLYMER MICROSPHERES FOR USE IN ADDITIVE MANUFACTURING

(71) Applicant: JABIL INC., St. Petersburg, FL (US)

(72) Inventors: Nicholas Dippel, St. Petersburg, FL (US); Thomas Gardner, St. Petersburg, FL (US)

(73) Assignee: JABIL INC.

( * ) Notice: Subject to any disclaimer, the term of this patent is extended or adjusted under 35 U.S.C. 154(b) by 241 days.

(21) Appl. No.: 17/311,635

(22) PCT Filed: Dec. 6, 2019

(86) PCT No.: PCT/US2019/065035
§ 371 (c)(1),
(2) Date: Jun. 7, 2021

(87) PCT Pub. No.: WO2020/118231
PCT Pub. Date: Jun. 11, 2020

(65) Prior Publication Data
US 2022/0016830 A1 Jan. 20, 2022

Related U.S. Application Data

(60) Provisional application No. 62/776,287, filed on Dec. 6, 2018.

(51) Int. Cl.
*B01J 2/16* (2006.01)
*G05B 23/02* (2006.01)
(Continued)

(52) U.S. Cl.
CPC ............ *G05B 23/0283* (2013.01); *B01J 2/16* (2013.01); *B29C 64/153* (2017.08);
(Continued)

(58) Field of Classification Search
CPC .......................................................... B01J 2/16
See application file for complete search history.

(56) References Cited

U.S. PATENT DOCUMENTS 3,166,613 A 1/1965 Wright et al.
3,295,160 A * 1/1967 Schippers ............. B29C 48/387
425/382.2
(Continued)

FOREIGN PATENT DOCUMENTS

DE 10339545 A1 3/2005
DE 202016106243 U1 8/2016
(Continued)

OTHER PUBLICATIONS

Machine translation of WO 2004067245, retrieved Mar. 30, 2023 (Year: 2023).*
(Continued)

*Primary Examiner* — Timothy Kennedy
(74) *Attorney, Agent, or Firm* — Riverside Law LLP (57) ABSTRACT

The embodiments are and include at least an apparatus, system and method for forming print material particles for additive manufacturing (AM) printing. The apparatus, system and method include at least a melt chamber comprising a polymer melt; a vertical extruder that fluidically receives the polymer melt; an atomizer that atomizes the polymer melt from the vertical extruder and that distributes the atomized polymer melt; a fall chamber comprising a plurality of zones into which the atomized polymer melt is distributed; and a collector to receive the print material particles formed of the atomized polymer melt after falling through the plurality of zones.

19 Claims, 5 Drawing Sheets

(51) Int. Cl.
  *G06T 19/00*     (2011.01)
  *G06F 8/65*      (2018.01)
  *G05B 19/042*    (2006.01)
  *B29C 64/307*    (2017.01)
  *B29C 64/364*    (2017.01)
  *B29C 64/153*    (2017.01)
  *B29C 64/245*    (2017.01)
  *B29C 64/295*    (2017.01)
  *B29C 64/205*    (2017.01)
  *B29C 64/25*     (2017.01)
  *H04L 9/40*      (2022.01)
  *H04W 4/38*      (2018.01)
  *B33Y 30/00*     (2015.01)

(52) U.S. Cl.
  CPC .......... *B29C 64/205* (2017.08); *B29C 64/245* (2017.08); *B29C 64/25* (2017.08); *B29C 64/295* (2017.08); *B29C 64/307* (2017.08); *B29C 64/364* (2017.08); *G05B 19/0425* (2013.01); *G06F 8/65* (2013.01); *G06T 19/006* (2013.01); *H04L 63/107* (2013.01); *H04W 4/38* (2018.02); *B29K 2823/06* (2013.01); *B29K 2995/0094* (2013.01); *B33Y 30/00* (2014.12)

(56) References Cited

U.S. PATENT DOCUMENTS

| | | |
|---|---|---|
| 6,533,563 B1 | 3/2003 | Otaigbe et al. |
| 10,981,130 B2 | 4/2021 | Dressler |
| 2003/0116080 A1 | 6/2003 | Huang |
| 2014/0163109 A1 | 6/2014 | Gerber et al. |
| 2014/0290435 A1 | 10/2014 | Sekine et al. |
| 2017/0008082 A1 | 1/2017 | Chen |

FOREIGN PATENT DOCUMENTS

| | | | | |
|---|---|---|---|---|
| DE | 102020103912 A1 | 2/2020 | | |
| EP | 0945173 A1 | 3/1999 | | |
| WO | WO-9400229 A1 * | 1/1994 | ........ | B01F 15/00837 |
| WO | WO-2004067245 A1 * | 8/2004 | ................ | B01J 2/04 |
| WO | 2020025312 A1 | 6/2020 | | |

OTHER PUBLICATIONS

OED definition of vane (https://www.oed.com/view/Entry/221362?redirectedFrom=vane#eid), retrieved Jun. 15, 2023 (Year: 2023).*

International Search Report for PCT/US2019/065035, dated Nov. 6, 2020.

Written Opinion of the International Searching Authority, dated Nov. 6, 2020.

Scientific Reports, NatureResearch, Thanh Huy Phung & Kye-Si Kwon; How to Manipulate Droplet Jetting from Needle Tyupe Jet Dispensers; 2019; p. 1-12.

Micromachines; MDPI; Shizhou Lu, Guangyu Cao, Hai Zheng, Dongqi Li,Meiyan Shi and Jiahui Qi; Simulation and Experiment on Droplet Formation and Separation for Needle-Type Micro-Liquid Jetting Dispenser; 2018; pp. 1-14.

Polymer Chemistry (2nd edition) Paul C. Hiemenz, Timothy P. Lodge; (Figure 13.16, Figure 13.21, Figure 13.33, p. 554, p. 555, p. 557, p. 559, p. 560).

* cited by examiner

APPARATUS, SYSTEM AND METHOD OF FORMING POLYMER MICROSPHERES FOR USE IN ADDITIVE MANUFACTURING

CROSS-REFERENCE TO RELATED APPLICATIONS

The present application claims benefit of priority to International Application No. PCT/2019/065035, filed Dec. 6, 2019, entitled: "Apparatus, System and Method of Forming Polymer Microspheres For Use In Additive Manufacturing," which claims priority to U.S. Provisional Application No. 62/776,287, filed Dec. 6, 2018, entitled: "Apparatus, System and Method of Forming Polymer Microspheres For Use In Additive Manufacturing," the entirety of which is incorporated herein by reference as if set forth in its entirety.

BACKGROUND

Field of the Disclosure

The present disclosure relates to additive manufacturing, and, more specifically, to an apparatus, system and method of forming polymer microspheres for use in additive manufacturing.

Description of the Background

Three-dimensional (3D) printing is any of various processes in which material is joined or solidified under computer control to create a three-dimensional object. The 3D print material is "added" onto a base, such as in the form of added liquid molecules or layers of powder grain or melted feed material, and upon successive fusion of the print material to the base, the 3D object is formed. 3D printing is thus a subset of additive manufacturing (AM).

A 3D printed object may be of almost any shape or geometry, and typically the computer control that oversees the creation of the 3D object executes from a digital data model or similar additive manufacturing file (AMF) file. Usually this AMF is executed on a layer-by-layer basis, and may include control of other hardware used to form the layers, such as lasers or heat sources.

There are many different technologies that are used to execute the AMF. Exemplary technologies may include: fused deposition modeling (FDM); stereolithography (SLA); digital light processing (DLP); selective laser sintering (SLS); selective laser melting (SLM); inkjet print manufacturing (IPM); laminated object manufacturing (LOM); and electronic beam melting (EBM).

Some of the foregoing methods melt or soften the print material to produce the print layers. For example, in FDM, the 3D object is produced by extruding small beads or streams of material which harden to form layers. A filament of thermoplastic, wire, or other material is fed into an extrusion nozzle head, which typically heats the material and turns the flow on and off.

Other methods, such as laser or similar beam-based techniques, may or may not heat the print material, such as a print powder, for the purpose of fusing the powder granules into layers. For example, such methods melt the powder using a high-energy laser to create fully dense materials that may have mechanical properties similar to those of conventional manufacturing methods. Alternatively, SLS, for example, uses a laser to solidify and bond grains of plastic, ceramic, glass, metal or other materials into layers to produce the 3D object. The laser traces the pattern of each layer slice into the bed of powder, the bed then lowers, and another layer is traced and bonded on top of the previous.

In contrast, other methods, such as IPM, may create the 3D object one layer at a time by spreading a layer of powder, and printing a binder in the cross-section of the 3D object. This binder may be printed using an inkjet-like process.

Currently, the known art typically produces powders for additive manufacturing using methods that are slow, inefficient, and which require significant effort. The foregoing notwithstanding, it is typical that such known processes produce print material that varies greatly in size and density, and which generally lack the sphericity needed for more refined print processes. Worse yet, such powder forming methods are not only exhaustive, expensive and inefficient, but are also often print material-specific. That is, the methods and materials used are varied in the known art in direct accordance with the desired composition of the print material to be produced.

SUMMARY

The embodiments are and include at least an apparatus, system and method for forming print material particles for additive manufacturing (AM) printing. The apparatus, system and method may include at least a melt chamber comprising a polymer melt; a vertical extruder that fluidically receives the polymer melt; an atomizer that atomizes the polymer melt from the vertical extruder and that distributes the atomized polymer melt; a fall chamber comprising a plurality of zones into which the atomized polymer melt is distributed; and a collector to receive the print material particles formed of the atomized polymer melt after falling through the plurality of zones.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed apparatus, system and method provide additive manufacturing materials, and enable the production of additively manufactured parts from those materials, having properties presently unavailable in the known art. Further, embodiments include designs for specification that may match and/or correlate particular print materials, print material fillers, and printed output objects given one or more processes available to produce the printed output object.

Historically, the use of additive manufacturing (AM), such as 3D printing, to produce parts having varying densities, such as a low density foam part, has been challenging and required custom machines and customized matching of materials. Contrary to the known art, the embodiments include materials and processes by which material is produced to more readily be used in existing AM technologies to produce parts of variable densities for various industries.

The embodiments may allow for a part to be printed from the provided print materials, and then selectively cut, crushed, or otherwise processed to create a final part. The part produced using AM can be printed very rapidly using existing AM printing technologies. Further, the inherent elastomeric properties of certain parts are more controllable throughout the printed part in the disclosed embodiments, due to the print material formation, and can thus be further tailored during and after the printing, than the known art.

Figure 1:
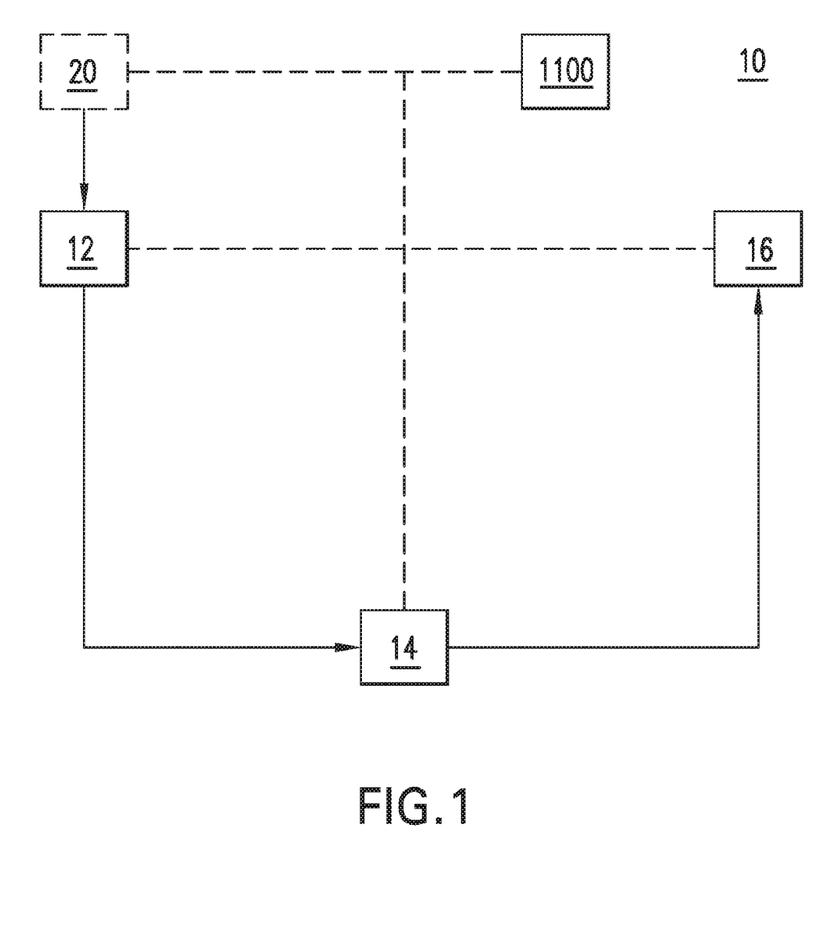
FIG. 1 is an illustration of an additive manufacturing printing system.

FIG. 1 illustrates a typical additive manufacturing (AM) system 10. In the illustration, a print material 12 is fed into a print process 14, such as the powder/pulverant-based AM processes discussed throughout, and the print process 14 outputs a printed 3D part 16. In the embodiments, the print material 12 may have the particular characteristics discussed herein, which may allow for the use of the print material 12 in any one or more processes 14, and which thereby result in any of various types of output parts 16 such as may have the characteristics discussed herein.

Figure 5:
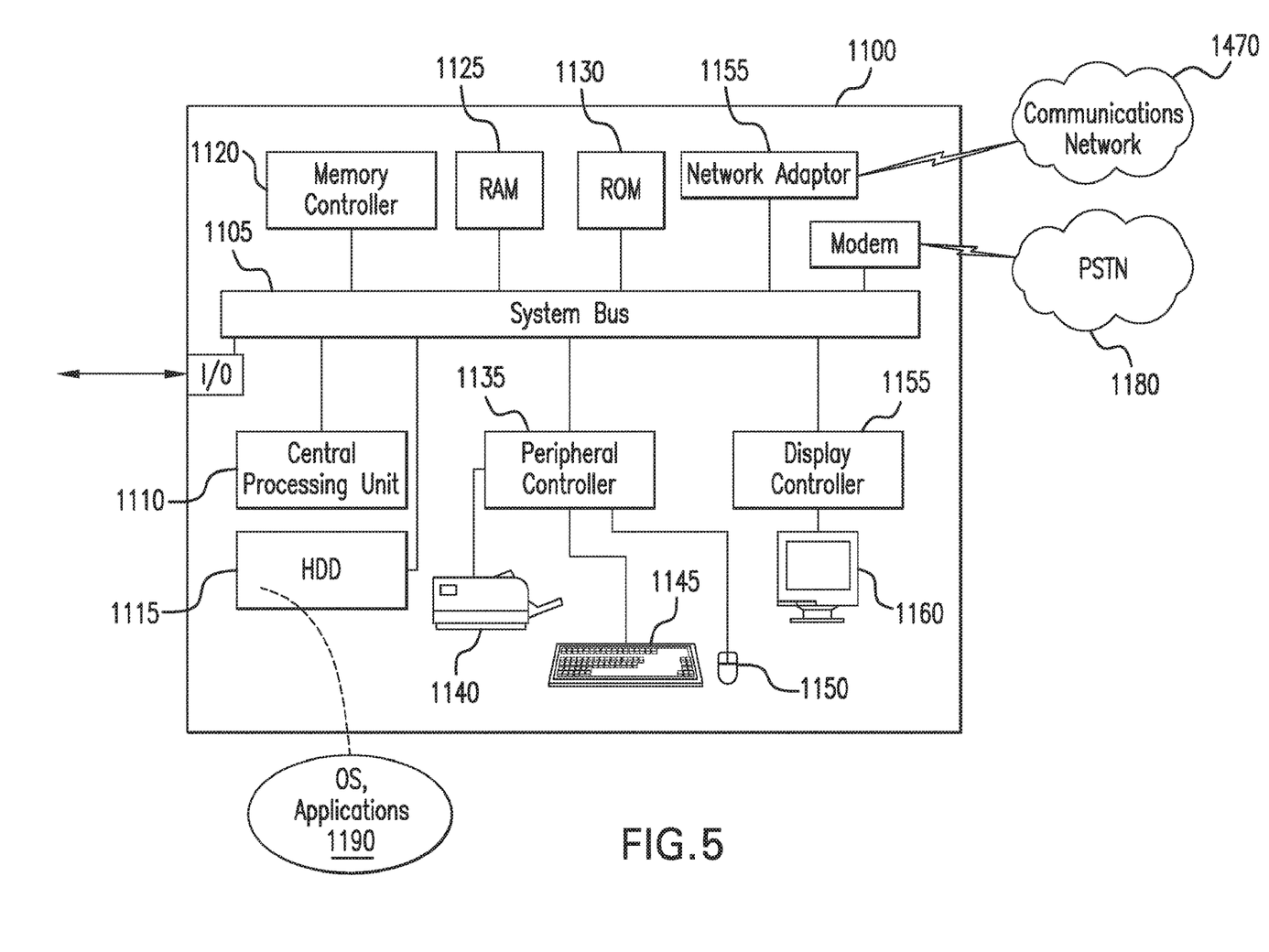
FIG. 5 illustrates an exemplary computing system.

Additionally, computing system 1100 may execute one or more programs/algorithms 1190 to control one or more aspects of system 10, as referenced throughout. By way of example, program 1190 may be the AMF referenced herein above, and the AMF 1190 may independently control at least process 14. The AMF may additionally control the selection and/or distribution of print material 12, compounds 12a, and/or additives and fillers, and may further modify processes 14, print materials 12, and so on in order to achieve a user-desired print output 16, as discussed further herein below.

More particularly, the embodiments may include specifically polymer-based print materials 12. These materials 12 may include a TPU-based microsphere, for example, and may additionally include one or more additives 20, such as may further enhance the operating characteristics and print operating windows discussed throughout the disclosure, and such as are discussed further herein below.

As referenced, the disclosed print input materials 12 may be used in powder-based AM processes 14, such as those in which the powder 120 including the material 12 may be spread, melted in a targeted manner, and/or allowed to or processed to solidify, thus forming successive layers that result in a three-dimensional output object/part 16 having the characteristics discussed herein as indicative of both the process 14 and the input print material 12. Processes 14 may include, but are not limited to: Selective Laser Sintering (SLS), Selective Laser Melting (SLM), Selective Heat Sintering (SHS), High Speed Sintering (HSS), Multi Jet Fusion (MJF), Binder Jetting (BJ), Material Jetting (MJ), Laminated Object Manufacturing (LOM), and other AM technologies referenced herein, and/or AM technologies that utilize thermoplastic powders/pulverants as may be known to the skilled artisan. It will also be understood to the skilled artisan that other AM and similar processes 14 may be modified to employ the print materials 12 disclosed herein, including but not limited to injection molding, roto molding, vacuum molding, subtractive manufacturing, and so on.

Figure 2:
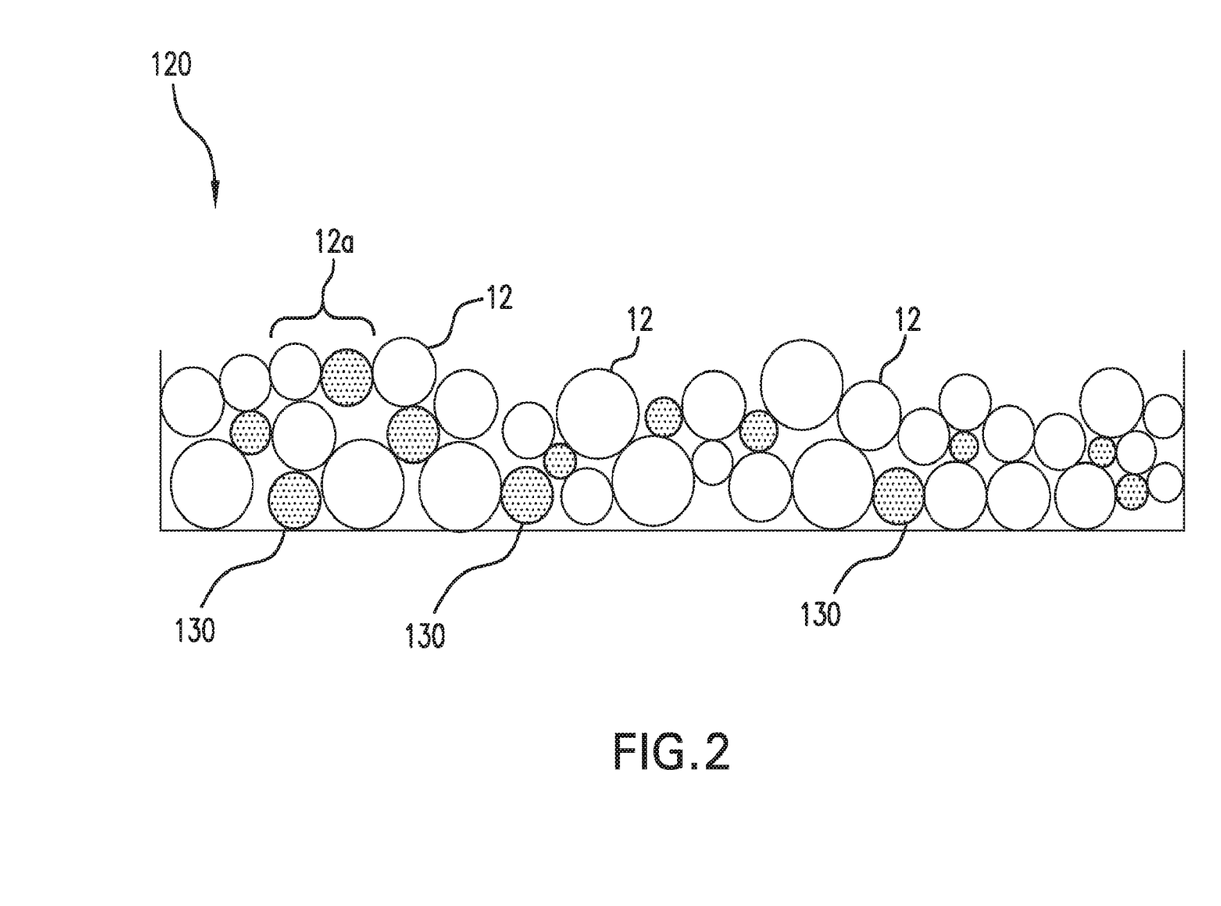
FIG. 2 illustrates an exemplary print material.

As referenced above, and referring now specifically to FIG. 2, additives 130 may be included with material 12 in forming powder 120. Additives 130 may provide desired characteristics to powder 120, may enable or improve aspects of processes 14, or may provide desired characteristics to output part 16 produced by exposure of the input print material 12 to process 14. Moreover, additives 130 may enable the particular characteristics of input print material 12 discussed herein. Additives 130 may include, by way of non-limiting example, glass beads, glass fibers, carbon fibers, carbon black, metal oxides, copper metals, flame retardants, antioxidants, pigments, powder flow aids, inks, and so on. For example, ink additives 130 may allow for modification of print material 12 properties, such as may provide for different functional inks for use in multi-jet fusion AM printing.

More particularly, the disclosure includes AM "printed" output objects 16 that are printed from print material 12. As referenced above with respect to FIG. 2, such a print material 12 may be formed of combined particles having combination chemical makeups in melt 1304 discussed below. The combination print material 12 may provide a variability in the density of the print material 12, and hence in the AM printed output 16.

Particles having a combination chemical makeup 12 may necessitate a solvent during particle formation, and the solvent may be, for example, a liquid or gas that serves as the medium for a chemical reaction. The solvent may be non-participatory with the reactants in a solution, wherein the solvent does not participate in the reaction; or participatory, wherein the solvent may be, for example an acid (proton), a base (removing protons), or a nucleophile (donating a lone pair of electrons), and may thereby contribute to the chemical reaction.

For different applications, the melt material 1304 may vary in accordance with the application in the disclosed embodiments. That is, the melt 1304 detailed below may have a combination chemical makeup, or may consist of solely polymer 1306. For example, foam-centric applications may require formation of an elastomeric print material 12 having high elongation, substantial rebound, and adequate compression. Applicable elastomeric compounds in the disclosed processes may thus include: styrene block copolymers, thermoplastic olefins, elastomeric alloys, thermoplastic polyurethanes, thermoplastic copolyesters, thermoplastic polyamides, ethylene-vinyl acetate, ethylene propylene rubber, ethylene propylene diene rubber, polyurethanes, silicones, polysulfides, elastolefins, high density polyethylene, low density polyethylene, linear low density polyethylene, polypropylene, polyolefin copolymers, polystyrene, polystyrene copolymers, polyacrylates, polymethacrylates, polyesters, polyvinylchloride, fluoropolymers, liquid crystal polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, liquid crystal polymers and/or combinations thereof.

The embodiments provide improved methods of producing polymer powders 120 using the aforementioned polymer melt 1304. Particular polymer-centric powders 120 may necessitate the use, in melt 1304 rather than as powder additives 130, of melt-processed reinforcements or other additives that do not generally allow for the use of the liquid or gas-based processes of the known art. The known art for producing polymer powders 120 for additive manufacturing (AM) systems generally consists of precipitation and/or compounding-grinding-polishing. That is, the known art necessitates a multi-step process to form powders 120 of particles 12 having combination chemical makeups, which is inefficient, and which leads to poor results, at least in that the greater the number the number of process steps that must be controlled, the great the number of process points at which errors can be introduced. The embodiments allow for the production of powders 120 having complex particles 12 in a single-step, single machine process, and are applicable to wide range of both neat and reinforced/modified polymers.

That is, aspects of the embodiments may provide an apparatus, system and method for mass production of high-quality spherical powders, and high aspect ratio microfibers, from molten polymers, such as for use as a print material in AM printing processes. The polymer melt is fed, such as from an extruder, into an atomizer for distribution of the atomized polymer melt into a fall chamber having a plurality of controlled zones.

For example, a high-pressure non-reactive gas, such as a nitrogen gas in the range of 7.6 MPa/1050 psi, may force the extruded polymer melt through an atomizer such that the molten polymer is forced into fine droplets that cool through the multiple zones to form spherical powder particles. Polyethylene-based powders, such as ranging in size from about 0.1 μm to about 200 μm, may thereby be efficiently produced in short cycle times by exerting control over several process variables, such as atomization temperature, the polymer melt stream size, the fall rate, and the process zones. By way of non-limiting example, a maximum weight fraction of the powder at 0-53 μm may be produced, such as by atomizing a 3.175-mm melt stream size at, by way of example, a range of 205° C.

Figure 3:
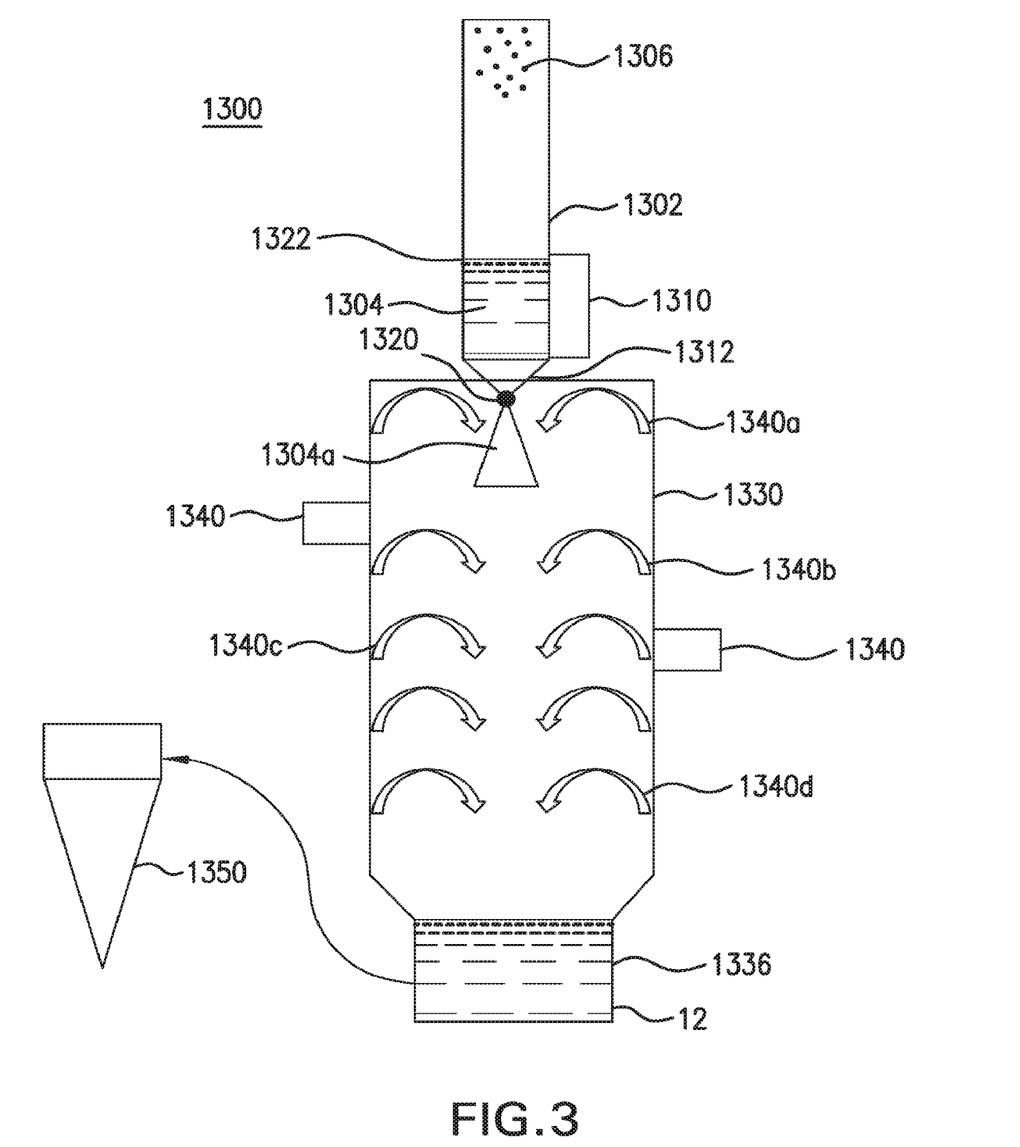
FIG. 3 illustrates print particle formation.

More particularly and as illustrated in FIG. 3, a process chamber 1300 in accordance with the embodiments may include, at an upper portion thereof, a vertical extruder or other vessel 1302 that contains a polymer melt 1304. By way of example, the polymer 1306 may enter the extruder or vessel 1302 as a pellet or other raw material state, and is then heated at least to its respective melt point to obtain a suitable viscosity of the melt 1304 for processing.

More specifically, the vessel 1302 containing the polymer 1306 may be heated, such as by heater 1310, past the respective Tm of that polymer 1306, after which a valve 1312 at the base of the vessel 1302 may be opened to allow the polymer melt 1304 to flow gravimetrically. Alternatively, the polymer 1306 may be melted in the vessel 1302, and may be pressurized to flow, such as through the atomizer 1320 referenced below. In this case, the flow path for the atomized melt may be heated in order to maintain the polymer melt 1304 in a molten state. Yet further and alternatively, a single or twin screw extruder 1322 may be mounted vertically atop the atomizer 1320 discussed below, and the polymer melt 1304 may be heated and compounded with various additives, such as to be alloyed, reinforced, or otherwise modified to a specific formulation, and the melt 1304 may then exit through a die.

The melt 1304 may be extruded or otherwise passed to atomizer 1320 that atomizes the melt 1304 into a given particle size. The atomizer 1320 may be or include at least one of a centrifugal, a spinning/chopping disc, or gas (which may include a gas source and pump)-driven atomizer that provides the atomization of the received melt 1304, as will be apparent to the skilled artisan in light of the discussion herein.

Of note, the fall chamber 1330 discussed herein may lead to preferred atomization techniques, as will be apparent to the skilled artisan. By way of example, a centrifugal and/or a spinning/chopping disc or similar atomizer may produce strings of polymer material, and thus may necessitate a wider fall chamber 1330, while such a design consideration for the fall chamber 1330 may not be relevant for gas-driven directed atomization.

The atomized polymer melt 1304a may include, such as within the melt 1304 or added during the atomization process, the aforementioned reinforcements or additives. The atomized melt 1304a may then "fall" through the powder processing fall chamber 1330, as illustrated. As such, the atomized melt 1304a may comprise a suitable molecular weight and melt viscosity to successfully crystallize in a controlled amount of time, i.e., to crystallize as the atomized melt "falls" through the fall chamber 1330 to the collection point 1336. It will be appreciated that, although the "fall' of the atomized melt 1304a may be dependent solely on gravity, other expedients or impediments to a gravity-based fall may be provided. By way of example, the chamber 1330 may be pressurized, may include one or more gas inlets or high pressure "blowers" or the like 1304, such as to advance or retard the "fall" through the fall chamber 1330.

The chamber 1330 is optimally sized and shaped so as to accommodate the full spray of the atomizer 1320, such as subject to any spray controls placed on the atomizer 1320 for a given process. That is, the chamber 1330 is sized and shaped so as to allow for controlled cooling of the maximum spray area for the atomized melt 1304a as the particles of the atomized melt 1304a fall/travel through the fall chamber 1330.

The fall chamber 1330 may comprise substantially uniform conditions through the fall zone, such as with respect to temperature and pressure, or may comprise a plurality of processing zones 1336. By way of example, the chamber may comprise a series of heating or cooling zones 1336a, 1336b, 1336c . . . , such as may cool the melt in accordance with a given control algorithm to obtain a desired final particle size and sphericity for produced print particle 12 from the provided atomized polymer melt 1304a. To that end, the fall chamber 1330 may comprise numerous heating or cooling elements 1304a, 1304b, 1304c . . . along the vertical axis thereof, and/or may include a tuned gas flow as required to control the temperature of the fall chamber, and, more particularly, the melt 1304a passing therethrough, at many points along the vertical axis of the fall chamber 1330. For example, one of the zones may hold the melt point of a particular polymer to build the crystalline region, such as a hold temperature of between 170-250 degrees C., and may then provide a series of controlled cooling zones to solidify the crystallized polymer into a dried powder particle 12.

The foregoing optimizes the control of the crystallinity and of other properties, such as the sphericity, of the polymer melt 1304a as it cools or is affirmatively cooled through the fall chamber 1330. The tuning and control, such as using the control algorithm 1190 discussed herein, of the polymer crystallization kinetics and/or of other powder characteristics allows for optimization for peak performance of the print material 12 formed by the disclosed system and method in an AM print process 14.

Thus, simply put, the chamber 1330 may provide a particular "fall" time, given the conditions in the chamber 1330. This fall time may or may not be divided into a series of time horizons, such as wherein each horizon comprises a fall time and temperature, such that the atomized melt is modified during the fall in order to reach a desired physical state as a pulverant/powder particle 12 upon reaching the collection point 1336.

As discussed, following the "fall" through the chamber 1330, collection of powder 12 at collection point 1336 may occur, such as prior to or in conjunction with particle separation. For example, powder collection may occur into a collection chamber acting as collection point 1336, which may be located at the base of the fall chamber 1330, or which may be adjacent to the fall chamber 1330 such that the powder is blown, rolled, sucked, or similarly collected into the adjacent collection chamber 1336.

Particle separation may separate the particles based on any known criteria, including, but not limited to, particle size, weight, sphericity, chemical makeup, or pursuant to other engineering design criteria. Further, particle separation may occur via any known methodology, such as the use of air classifiers, cyclones, or the like within or otherwise in fluidic communication with collection point/chamber 1336.

By way of non-limiting example, an air classifier 1350, which is commonly employed in industrial processes in which a volume of mixed materials with differing physical characteristics needs to be separated quickly and efficiently, may separate the powder 12 based on size, shape, or density, by way of non-limiting example. In such a case, the powder 12 may be injected for sorting from collection point 1336 into air classifier 1350, which may comprise a column of rising air. In the air classifier 1350, air drag on the powder 12 supplies an upward force, which counteracts the force of gravity and lifts the powder 12 to be sorted. And, due to the dependence of air drag on each particle's size and shape, the powder particles 12 in the moving air column are sorted vertically and thereby separated.

Collection of only powder particles having the desired characteristics, such as the desired particle size range, provides for further optimization of the powder collected as a print material 12 for use in a particular AM process 14. Moreover, powder particles that fail to meet the separation characteristics, such as being too large or too small, may be collected for re-melt into melt 1304, thus implementing a "zero waste" process in certain of the embodiments.

Figure 4:
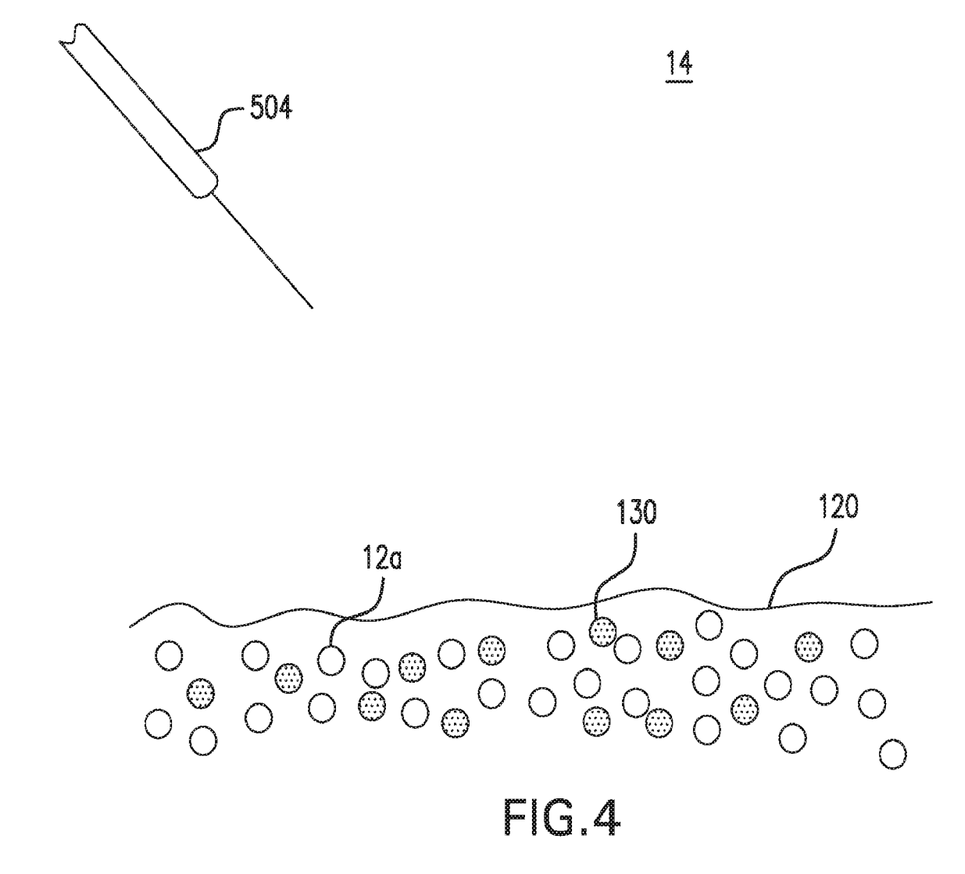
FIG. 4 illustrates additive manufacturing printing.

Once the print particles 12 are created, they may be printed using an AM process 14, as illustrated in FIG. 4. The AM printing process 14 may use a laser 504, and thus may be, for example, a dry blend SLS print. In such an embodiment, the particles 12 may also be dry blended with additives 130, and the blended powder 120 may then be printed to a form 16, layer-by-layer, using an SLS printer as discussed above.

Similarly, wherein the AM printing process is a powder bed fusion process, a single thin layer, such as an approximately 0.1 mm thick layer, of compound print material 12 in powder 120, such as may be created using the methodologies discussed above, may be spread over a build platform. The laser 504 may then fuse the first layer, or first cross section, of the model. Thereafter, a new layer of the compound print material 12 in powder 120 is spread across the previous layer, such as using a roller. Further layers or cross sections may then be added until the entire model is created. Loose, unfused powder print material may remain in position throughout, but may be removed during post processing, by way of non-limiting example.

Also in a manner similar to that of FIG. 4, binder jetting may use a "binder", rather than or in addition to a laser 504. In such an embodiment, the powder print material 12 may be spread over the build platform, such as using a roller. A print head may then deposit a binder adhesive on top of the powder where required. The build platform may then be lowered by the model's layer thickness. Another layer of powder may then be spread over the previous layer, and the object is formed where the powder is bound to the liquid, layer-by-layer.

A multijet fusion methodology may operate in a manner similar to the powder bed fusion, but may employ heat lamps or similar technologies, rather than a laser. Likewise, in a directed energy deposition AM method, an axis arm with a nozzle may move around a fixed object, and the print material 12 may be deposited from the nozzle onto existing surfaces of the object. The material may be provided, by way of example, in wire/filament or powder form, and may be melted for dispersal from the nozzle using a laser, electron beam or plasma arc.

Various other methodologies may provide a suitable format for the print particles 12 to enable or improve printing using AM technologies. For example, a sheet may be made from the powder print materials, or a filament may be provided. Moreover, additives may be provided in the print material to enable or improve printing and/or object formation. Additive materials may include, but are not limited to, hollow metal oxide beads or hollow polymeric spheres.

In each such embodiment, parameters of interest for the print material 12 may include parameters such as moisture level, heat of build chamber, heater power and temperature emitted, time of heat exposure, time between layers, feed rate, feed temperature, pressure and vacuum, gas flow rate, and the like. In short, the core print particle 12 or an aspect thereof may melt, such as upon exposure to a laser, and thus fuses to nearby particles during an AM process. As such, the print material 12 should be heated during the selected AM print process 14 past its respective melting point. Under such circumstances, the respective polymer chains may suitably bond with those of the particle next to each particle, to form output 16. The selected AM print process 14 may allow that bond to cool, and thus the cooled particle chains form a solid layer in output 16. Of course, each print material 12 may also be subjected to additives 130 as discussed throughout, such as may aid with melting or flow during melting, with impact resistance, or with heat stabilization, by way of example, dependent upon the AM process selected.

As such, an output part 16 processed as described herein may provide correlated characteristics that are indicative of, and/or correlated to, the input material 12, and which occur pursuant to application of AM process 14, as described herein throughout. Such correlated characteristics may be measured, by way of non-limiting example, by heat-flowing a sample of the input 12 and/or the output 16, and then measuring thermal characteristics of the heat-flowed sample, such as Tm, Tg, Tcryst, heat of fusion, and the like. Likewise, infrared microscopy may allow for identification of the wavelengths of the corresponding chemical structures of the input material and/or the output object layers. Yet further, a thermogravimetric or similar analysis may be performed on a sample of the input material 12 or printed output 16, and this analysis may further include measurement of the composition of decomposition gases as the sample degrades, by way of example.

Of course, in view of the aforementioned prospective correlation of characteristics between an input print material 12 and a printed output object 16, the correlated characteristics of output object 16 may vary dependently not only in accordance with the input material 12, but additionally based upon the process 14 employed to print the print material 12 into the output object 16. Accordingly, one or more computing programs/algorithms 1190, such as may comprise one or more AMF files; one or more input material 12 and/or additive 130 choices; one or more process 14 choices and/or one or more process characteristics choices; and/or one or more output 16 shape, size, and/or characteristic choices, may be executed by a computing system 1100. This execution may occur, for example, pursuant to an instruction to a GUI, such as to provide a particular correlation as between an input material 12 and/or additives 130 and a specific output object characteristic, and/or to use a particular available input material 12, using an available process 14, to target the ultimate production of a particular output object 16. This is illustrated with particularity in FIG. 5.

More particularly, FIG. 5 depicts an exemplary computing system 1100 for use in association with the herein described systems and methods. Computing system 1100 is capable of executing software, such as an operating system (OS) and/or one or more computing applications/algorithms 1190, such as applications applying the algorithms discussed herein, and may execute such applications 1190 using data, such as materials and process-related data, which may be stored 1115 locally or remotely.

More particularly, the operation of an exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software, such as an operating system (OS), executable programs such as the aforementioned correlation applications, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or other presentations generated by or at the request of computing system 1100, such as in the form of a GUI, responsive to operation of the aforementioned computing program(s). Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An apparatus for forming print material particles for additive manufacturing (AM) printing, comprising:
   a melt chamber comprising a polymer melt;
   a vertical extruder that fluidically receives the polymer melt;
   an atomizer that atomizes the polymer melt from the vertical extruder and that distributes the atomized polymer melt;
   a fall chamber comprising a plurality of zones into which the atomized polymer melt is distributed, the plurality of zones comprising:
     a plurality of heating zones comprising at least one heating zone including a heat emitter capable of providing a temperature of 250 degrees C. to the atomized polymer melt in the fall chamber; and
     a plurality of cooling zones comprising at least one cooling zone corresponding to a cooling element;
   one or more gas inlets suitable, in conjunction with at least both (i) the heat emitter and (ii) the cooling element, to control a flow of the distribution of the atomized polymer melt in the fall chamber; and
   a collector to receive the print material particles formed of the atomized polymer melt after falling through the plurality of zones.

2. The apparatus of claim 1, wherein the atomizer comprises a high-pressure non-reactive gas jet.

3. The apparatus of claim 2, wherein the non-reactive gas comprises nitrogen gas.

4. The apparatus of claim 3, wherein the high pressure is about 1050 psi.

5. The apparatus of claim 1, wherein the print material particles range in size from about 0.1 µm to about 200 µm.

6. The apparatus of claim 1, wherein the melt is polyethylene-based.

7. The apparatus of claim 1, further comprising a feeder to the melt chamber, wherein the polymer in the feeder comprises pellets.

8. The apparatus of claim 1, wherein the melt chamber comprises a heater to form the polymer melt.

9. The apparatus of claim 1, wherein the vertical extruder comprises at least one heater.

10. The apparatus of claim 1, wherein the plurality of zones comprise the plurality heating zones and the plurality of cooling zones alternating.

11. The apparatus of claim 1, wherein the extruder comprises a twin screw extruder.

12. The apparatus of claim 1, wherein the polymer melt comprises non-polymer additives.

13. The apparatus of claim 12, wherein the additives comprise at least one of an alloy and a reinforcement.

14. The apparatus of claim 1, wherein the atomizer comprises one of a centrifugal, a chopping disc, and a gas atomization.

15. The apparatus of claim 1, wherein the collector further comprises a classifier.

16. The apparatus of claim 15, wherein the classifier is an air classifier.

17. The apparatus of claim 1, wherein the one or more gas inlets, the heat emitter, and the cooling element retard the flow of the distribution of the atomized polymer melt.

18. The apparatus of claim 1, wherein the one or more gas inlets, the heat emitter, and the cooling element advance the flow of the distribution of the atomized polymer melt.

19. The apparatus of claim 1, wherein one of the cooling zones of the plurality of cooling zones is positioned below one heating zone of the plurality of heating zones.

\* \* \* \* \*